United States Patent
Wetzel et al.

(10) Patent No.: US 7,222,507 B2
(45) Date of Patent: May 29, 2007

(54) DEVICE AND METHOD FOR DETERMINING PARAMETERS

(75) Inventors: Gabriel Wetzel, Korntal (DE); Klaus-Dieter Leimbach, Eschach (DE)

(73) Assignee: Robert Bosch GmbH, Stuttgart (DE)

( * ) Notice: Subject to any disclaimer, the term of this patent is extended or adjusted under 35 U.S.C. 154(b) by 126 days.

(21) Appl. No.: 10/497,733

(22) PCT Filed: Nov. 27, 2002

(86) PCT No.: PCT/DE02/04359

§ 371 (c)(1),
(2), (4) Date: Jan. 4, 2005

(87) PCT Pub. No.: WO03/049981

PCT Pub. Date: Jun. 19, 2003

(65) Prior Publication Data

US 2005/0107938 A1    May 19, 2005

(30) Foreign Application Priority Data

Dec. 8, 2001    (DE) .............................. 101 60 353

(51) Int. Cl.
   B60G 17/0195    (2006.01)
   B60T 8/1755    (2006.01)
   B62D 6/04    (2006.01)

(52) U.S. Cl. .............................. 70/48; 701/41; 701/70

(58) Field of Classification Search ...................... None
   See application file for complete search history.

(56) References Cited

U.S. PATENT DOCUMENTS 5,945,601 A    8/1999 Hosoi et al.

6,226,581 B1 *    5/2001 Reimann et al. ............... 701/48
2001/0003810 A1    6/2001 Shinmura et al.

FOREIGN PATENT DOCUMENTS

| DE | 22 12 328 | 9/1973 |
|---|---|---|
| DE | 40 10 332 | 10/1990 |
| DE | 43 00 255 | 7/1993 |
| DE | 42 16 301 | 11/1993 |
| DE | 44 19 131 | 12/1994 |
| DE | 197 51 227 | 9/1998 |
| DE | 197 49 005 | 1/1999 |
| EP | 0 487 967 | 6/1992 |
| WO | WO 99 67115 | 12/1999 |

OTHER PUBLICATIONS

English Language Abstract of DE 197 49 005.

* cited by examiner

*Primary Examiner*—Michael J. Zanelli
(74) *Attorney, Agent, or Firm*—Kenyon & Kenyon LLP

(57) ABSTRACT

A system for determining quantities which influence the operating dynamics of a motor vehicle, the system containing at least two different control and/or regulating systems by which, independently of one another and independently of the driver, intervention measures which influence the vehicle dynamics may be performed with the help of suitable actuators, in response to one of these at least two different control and/or regulating systems carrying out an intervention influencing the operating dynamics of the vehicle, in each case the same quantity which describes the vehicle dynamics being altered by this intervention, at least two of the intervention measures influencing the vehicle dynamics being implemented in such a way that the same quantity which describes the vehicle dynamics is altered as little as possible by the intervention measures, and in the ideal case is not altered at all.

10 Claims, 4 Drawing Sheets

DEVICE AND METHOD FOR DETERMINING PARAMETERS

FIELD OF THE INVENTION

The invention relates to a system for determining quantities which influence the operating dynamics of a motor vehicle.

DESCRIPTION OF RELATED ART

German Patent 44 19 131 describes an invention for a motor vehicle, preferably a passenger vehicle having a hydraulic anti-lock brake system (ABS). To resolve the general conflict in goals between braking distance and driving stability with traditional ABS systems, the braking pressures supplied to the brakes of the individual vehicle wheels are regulated completely independently of one another and exclusively as a function of the individual locking risk of the individual vehicle wheels determined in each case, so that the adhesion between the road surface and the wheel prevailing at the individual wheels is utilized to the best possible extent and thus the shortest possible braking distance, i.e., stopping distance is achieved. In this way any trends toward directional instability, i.e., driving instability, that might occur are compensated easily by a regulated steering system in which an additional steering angle which depends on the particular yaw rate of the vehicle, for example, is automatically superimposed on a basic steering angle, which may be determined manually by the driver by manipulation of the steering wheel, for the purpose of maintaining driving stability of the vehicle.

German Patent 197 49 005 describes a device and a method for regulating movement variables representing the movement of the vehicle. This device contains first means for detecting variables representing the movement of the vehicle. The device also contains at least two regulating devices which perform regulating interventions independently of one another to stabilize the vehicle with the help of suitable actuators based on variables detected with the help of the first means. At least one regulating device here intervenes in the steering of the vehicle. Furthermore, at least one regulating device intervenes in the brakes and/or in the engine of the vehicle and/or another regulating device intervenes in the chassis actuators. In addition, the device contains second means using which signals and/or variables are determined on the basis of the variables detected using the first means and then are used to influence at least one of the at least two regulating devices at least temporarily to stabilize the vehicle. At least one of the at least two regulating devices then performs regulating interventions to stabilize the vehicle, uninfluenced by the second means, until being influenced by the signals and/or variables determined with the help of the second means.

SUMMARY OF THE INVENTION

Although the publications described as belonging to the related art are concerned with the task of regulating operating-dynamics variables, the present invention is related to the determination of quantities which influence the operating dynamics of a motor vehicle.

The present invention relates to a system for determining quantities which influence the operating dynamics of a motor vehicle, the system containing at least two different control and/or regulating systems by which, independently of one another and independently of the driver, interventions influencing the vehicle operating dynamics are able to be carried out with the aid of suitable actuators, in response to one of these at least two different control and/or regulating systems carrying out an intervention influencing the operating dynamics of the vehicle, in each case the same quantity which describes the vehicle dynamics being altered by this intervention, at least two of the intervention measures which influence the vehicle dynamics being implemented by two of these different control and/or regulating systems so that the same quantity which describes the vehicle dynamics is altered as little as possible by these measures and in the ideal case is not altered at all.

Due to the fact that the quantity describing the vehicle dynamics changes as little as possible, a high measure of driving comfort is retained. At the same time due, to the measures described here, the vehicle does not get into a dangerous driving situation.

An advantageous embodiment of the system is characterized in that at least two of the following control and/or regulating systems are provided as the different control and/or regulating systems, namely a control and/or regulating system which intervenes in the brakes, a control and/or regulating system which intervenes in the engine, a control and/or regulating system which intervenes in the steering of the vehicle, a control and/or regulating system which intervenes in the vehicle shock absorbers and a control and/or regulating system which intervenes in the stabilizers.

It is also advantageous if the at least two interventions which influence the vehicle dynamics are performed simultaneously. The term "simultaneously" is intended to mean here "essentially simultaneously" because a precise simultaneity in the mathematical sense is impossible due to different switching times of actuators.

An advantageous embodiment is characterized in that the variable which describes the vehicle dynamics and is altered as little as possible by the interventions and in the ideal case is not altered at all is a variable which, when changed, has an influence on the transverse dynamics of the vehicle.

Another advantageous embodiment is characterized in that the variable which describes the vehicle dynamics and which is altered as little as possible by the interventions and in the ideal case is not altered at all is the yaw rate. A yaw rate sensor is already present in many vehicles today. Therefore, in checking whether the yaw rate has changed, it is possible to use the output signals of this sensor without any significant additional effort.

It is also advantageous if the at least two different control and/or regulating systems include a control and/or regulating system which intervenes in the steering of the vehicle and a control and/or regulating system which intervenes in the brakes of the vehicle. For example, this refers to an electrohydraulic brake (EHB) for the brake interventions and a steering controller for the steering intervention. Both of these systems allow very precise intervention, which is advantageous for the present invention.

It is advantageous if the interventions of the at least two different control and/or regulating systems are performed only when the vehicle is traveling straight ahead. This driving state is the simplest to describe in terms of vehicle dynamics and the vehicle may be regulated to a yaw rate of zero for example.

An advantageous embodiment is characterized in that at least two interventions which influence the vehicle dynamics are performed with graduated intensity by the at least two different control and/or regulating systems. This makes it possible to determine characteristic curves.

BRIEF DESCRIPTION OF THE DRAWINGS

The present invention will be described in greater detail with reference to the following drawings wherein.

DETAILED DESCRIPTION OF THE INVENTION

Figure 1:
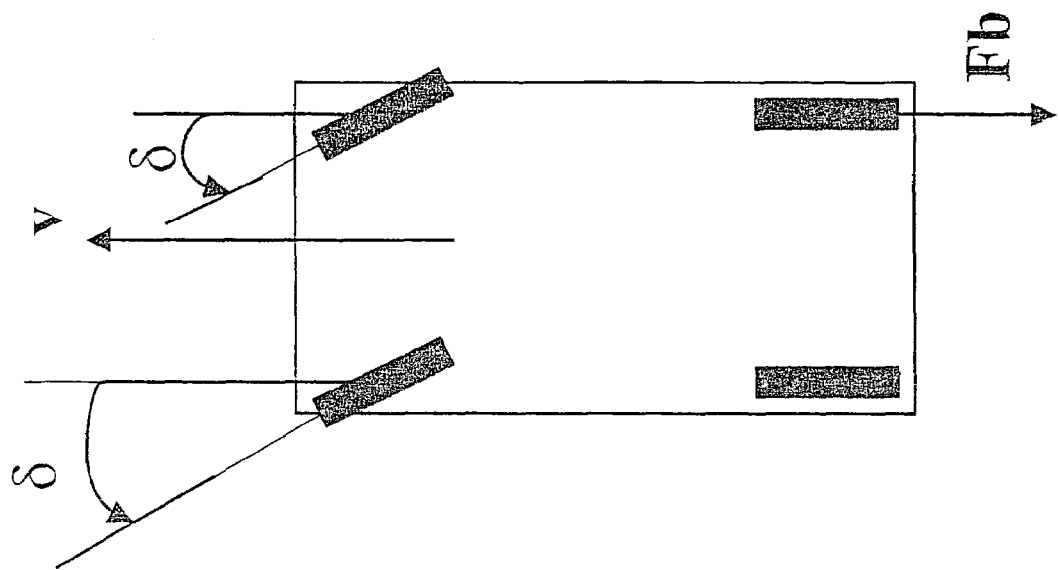
FIG. 1 shows at the left a vehicle without simultaneous steering and braking interventions and at the right a vehicle with simultaneous steering and braking interventions.
Figure 1:
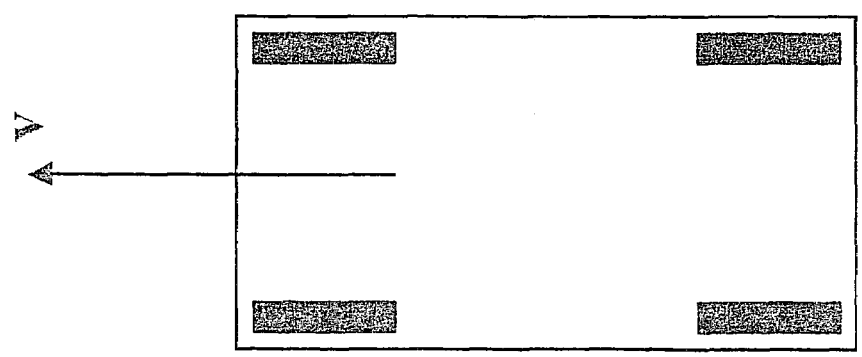

The core of this exemplary embodiment is the active use of the steering and the brakes to determine characteristic quantities. The term "characteristic quantities" is understood here to refer to the following quantities, for example:
- wheel loads
- brake characteristic curves (hysteresis, slope)
- tire characteristic curves (lateral rigidities, longitudinal rigidities)
- steering characteristic quantities
- adhesion coefficients The core of the present invention is linking the steering and braking interventions in such a way that they do not have any significant or perceptible influence on the transverse dynamic driving performance. This method is explained in greater detail in conjunction with FIG. 1. The left of FIG. 1 shows a vehicle without braking and steering intervention, and the right shows a vehicle with targeted braking and steering intervention. The solid black blocks represent the wheels of the vehicle. In both cases the vehicle should follow a certain driving direction at the velocity v which corresponds to the driver's intent. This driving direction is depicted in FIG. 1 by the vertical arrow pointing upward.

The following three imaginary experiments will now be performed for the vehicle on the right in FIG. 1:
1. There is only one steering intervention which causes the two front wheels to turn to the left (the steering angle is δ as shown in FIG. 1). There is no braking intervention. Now a yaw torque MpsiL occurs, rotating the vehicle to the left. As a result the vehicle travels along a curve to the left.
2. There is only a braking intervention on the right rear wheel (with braking force Fb as shown here) but there is no steering intervention. As a result the vehicle executes a yawing motion about the right rear wheel causing the vehicle to turn to the right. The yaw torque here is MpsiR.
3. Now the above-mentioned steering intervention as well as the above-mentioned brake intervention are performed at the same time. Thus two competing effects occur which tend to steer the vehicle both to the left and to the right. It is possible to select the intensity of the steering intervention (measurable by steering angle δ, for example) and the intensity of the brake intervention (measurable by the pressure in the wheel brake cylinder of the right rear wheel in the case of hydraulic or electrohydraulic brakes (EHB), for example, or measurable via the current in the case of electromechanical brakes (EMB)), so that the two competing effects cancel each other out and the vehicle continues to travel straight ahead. This means that yaw torques MpsiL and MpsiR are equal in absolute value but have different signs. Therefore, the yaw torques cancel each other out and the vehicle continues to travel straight ahead. This is expressed mathematically by Mpsi=MpsiR+MpsiL=0. Yaw torque Mpsi is a torque having the dimension Nm.

Accurately and precisely regulated brake interventions are possible for example using an electrohydraulic brake (EHB), and accurately and precisely regulated steering interventions are possible with an FLS steering controller (FLS=vehicle dynamics steering system). Since there is no perceptible influence on the transverse dynamic driving performance through the combination of the two interventions, driving comfort does not suffer as a result of such a method. This also prevents any safety risk due to lateral movement of the vehicle.

Figure 2:
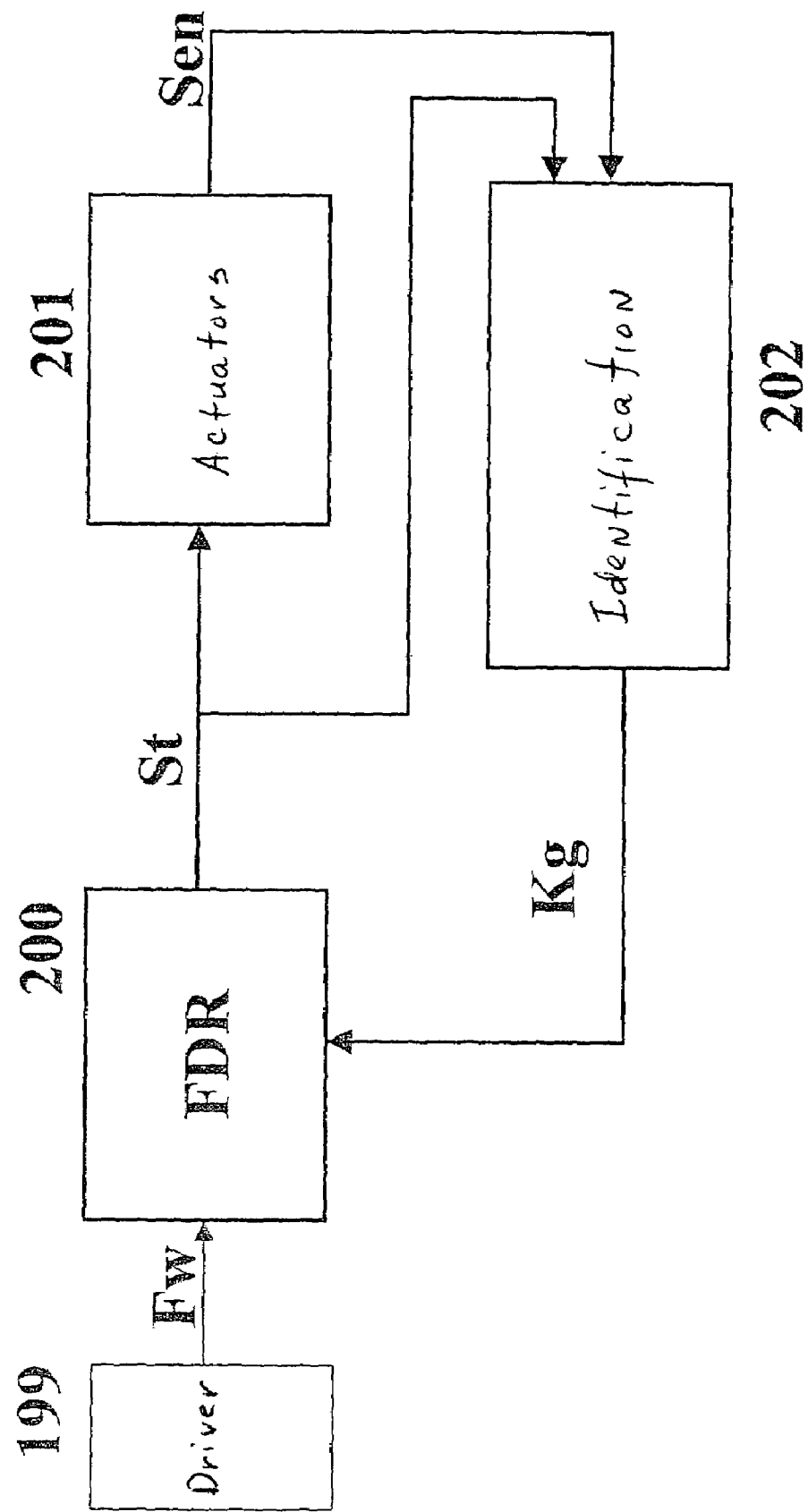
FIG. 2 shows the interaction of the vehicle dynamics regulator with the vehicle and the identification block.

FIG. 2 illustrates the device for identification of the characteristic quantities where it is embedded in the system which includes the vehicle dynamics regulator and the motor vehicle.

The following symbols and blocks are used:
Fw=quantities describing the driver's intent,
St=manipulated variables,
Sen=sensor signals and
Kg=characteristic quantities.
199=driver
200=vehicle dynamics regulator
201=vehicle (including sensors and actuators)
202=characteristic quantity identification block The topological structure of FIG. 2 is as follows:
Block 199 supplies quantities Fw to block 200.
Block 200 supplies quantities St to blocks 201 and 202.
Block 201 supplies quantities Sen to block 202.
Block 202 supplies the quantity Kg to block 200.

The blocks contained in FIG. 2 are described in greater detail below:
Block 199 represents the driver of the vehicle, who makes available quantities Fw describing the driver's intent. These include quantities such as the steering wheel position, the brake pedal position, the gas pedal position and the changes in these quantities over time.

Block 200 is the vehicle dynamics regulator which may be a vehicle dynamics regulating system (FDR=vehicle dynamics regulation, ESP=electronic stability program), for example, a traction control (TC) or an anti-lock brake system (ABS). Important input quantities for the present invention include driver's intent Fw and characteristic quantities Kg.

Block 201 represents the vehicle which responds to the manipulated variables coming from block 200. This response is manifested, for example, in actuation of actuators in the vehicle (brakes, engine control, steering intervention) and then in the geometric shape of the curve traveled by the vehicle. Block 201 receives the manipulated variables as input signals. The output signals from block 201 are sensor signals Sen which are supplied by sensors that may be mounted on the vehicle. It is quite conceivable here to include sensors that supply information regarding the vehicle (e.g., location, speed) and are not mounted on the vehicle.

Block 201 also includes the sensors belonging to the vehicle (brake pressure, steering angle, yaw rate, etc.) and actuators (brakes, steering, etc.).

Block 202 is the identification block. The characteristic quantities are calculated in this block and then sent to the vehicle dynamics regulator. The identification block receives manipulated variables and sensor signals as input signals.

In block 201, for example, sensors are available for detection of the following variables:
- brake pressure of the individual wheel brake cylinders, i.e., the pressure in the brake circuit and/or the brake current in the case of the electromechanical brake (EMB)
- steering angle
- yaw rate
- transverse acceleration
- wheel rotational speeds or wheel speeds The variables measured by the sensors are indicated in FIG. 2 as sensor signals Sen. In addition to the sensor signals, manipulated variables St and characteristic quantities Kg also occur in FIG. 2.

Manipulated variables are understood to be the variables which are regulated to a stable state by vehicle dynamics regulator 200. Examples of this include the electric current through an electric steering device and/or an electric steering controller or the brake pressure in the individual wheel brake cylinders. These quantities are not detected directly by sensors but instead are calculated in vehicle dynamics regulator 200. The controllers and actuators in the vehicle are influenced by these manipulated variables.

The characteristic quantities are identified in block 202. It is possible to differentiate between vehicle characteristic quantities and environmental characteristic quantities. The vehicle characteristic quantities may include, for example, wheel loads, brake characteristic curves (hysteresis, steepness), tire characteristic curves, inflatable-spare-tire recognition or steering characteristic quantities. The environmental characteristic quantities may include, for example, adhesion coefficients between the tire and road.

The instantaneous identification of the characteristic quantities in block 202 is based on the comparison between the available signals (manipulated variables, sensor signals) and the values estimated using an internal model in block 202. Through this comparison the characteristics quantities that are being sought are identified so that they are available for the next computation step in vehicle dynamics regulator 200 and in the model in block 202. To be able to perform the identification, the manipulated variables and/or the sensor signals must often be different from zero. This is a very significant restriction which may have a great influence on the efficiency of vehicle dynamics regulators. For example, in certain driving states such as a freely rolling vehicle, the vehicle dynamics regulators are unable to estimate certain characteristic quantities.

Figure 3:
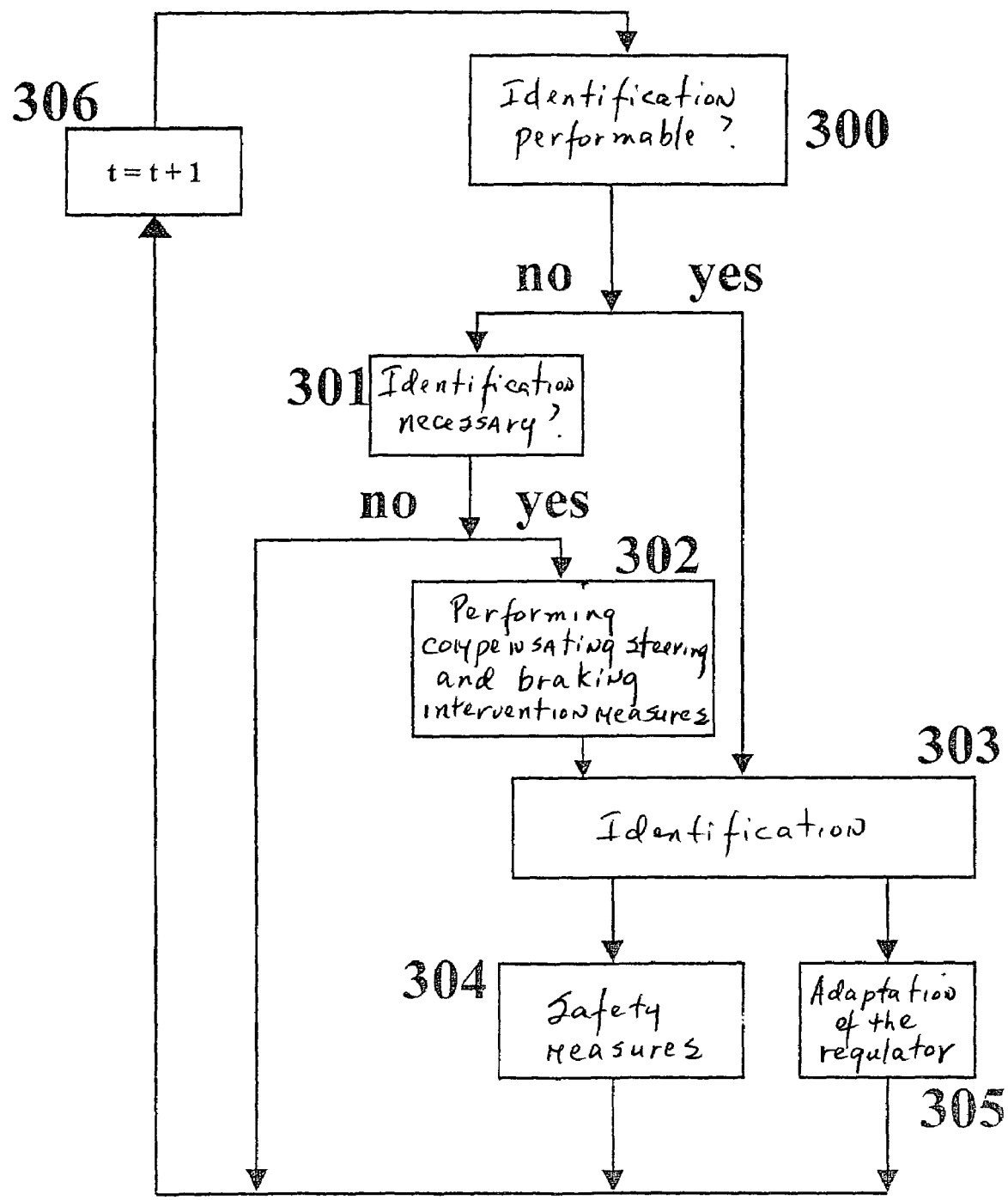
FIG. 3 shows the sequence of the method performed in the identification block.

FIG. 3 illustrates the method for identification of characteristics.

The individual blocks here have the following meanings:

Block 300: Inquiry whether an identification of characteristic quantities is feasible at all using the manipulated variables currently available.

Block 301: Inquiry whether an identification is necessary at all.

Block 302: Performing mutually compensating steering and braking interventions.

Block 303: Identification of the characteristic quantities.

Block 304: Implementing safety measures.

Block 305: Adaptation of the regulator.

Block 306: Time incrementation t=t+1

The topology of FIG. 3 is as follows:

In block 300 there is an inquiry as to whether an identification is feasible. If the answer is "yes" (shown as "yes" in FIG. 3) then the sequence proceeds to block 303. If the answer is "no" (shown as "no" in FIG. 3) then the sequence branches off to block 301.

In block 301 there is another inquiry as to whether an identification is necessary. If the answer is "yes" (shown as "yes" in FIG. 3), then the sequence continues to block 302. If the answer is "no" (shown as "no" in FIG. 3), then the sequence branches off to block 306.

The output signals of block 303 are sent to blocks 304 and 305.

The output signals of block 302 are sent to block 303.

The output signals of blocks 304 and 305 are sent to block 306.

The output signals of block 306 are sent to block 300.

The layout of FIG. 3 will now be explained in detail. In block 300 it is ascertained whether the identification of the characteristic quantities is feasible with the manipulated variables currently available (e.g., the instantaneous steering angle or the instantaneous brake pressure). If the identification is feasible, then it is performed in block 303. If the identification is not feasible at the moment, then it is determined in block 301 whether an identification is necessary at all at the present point in time. If an identification is not necessary at the present point in time, then the sequence starts again in block 300 at a later point in time. This is indicated by the incrementation of time (t=t+1) which is performed in block 306. However, if an identification is necessary at the current point in time, then the compensating steering and braking interventions are set in block 302. These interventions (and thus the manipulated variables on which they are based) are linked so that the driver senses little or no influence. Identification of the characteristic quantities is then performed in block 303. After successful identification, either safety measures are initiated in block 304 (an example of this is identification of a tire pressure loss in which case a restriction of the maximum vehicle speed, for example, might be considered as a safety measure) and/or there is an adaptation of vehicle dynamics regulator 200 in block 305. Adaptation of the vehicle dynamics regulator is to be understood for example as adapting the model or characteristic curves implemented in it to the characteristic quantities currently determined. After implementing the safety measures (block 304) or implementing the adaptation of the regulator (block 305), the time is incremented in block 306 and then another check as to whether an identification of the characteristic quantities is feasible using the current manipulated variables begins in block 300.

The exemplary embodiment is to be made more specific below. Yaw moment Mpsi may be expressed in general as a function f1 of longitudinal forces FL acting on the vehicle and lateral force FS acting on the vehicle:

Mpsi=f1(FL, FS).

Yaw moment Mpsi is closely related to yaw rate psi occurring then (essentially the Newtonian motion equation), so yaw rate psi occurring may thus also be expressed as a function of FL and FS.

In the example according to FIG. 1, the front wheels are slightly steered, i.e., lateral forces occur on the front wheels. These depend on coefficient of friction μ between the tire and the road surface, steering angle δ and the normal forces acting on these wheels (=tire contact forces) Fnvl and Fnvr (Fnvr=normal force right front, Fnvl=normal force left front):

FS=f2($\mu$, $\delta$, Fnvr, Fnvl).

The right rear wheel is braked. The braking force depends on braking pressure pB on this wheel, coefficient of friction $\mu$ and tire contact force Fnhr (=normal force right rear):

FL=f3($\mu$, pB, Fnhr).

Now the following considerations shall be formulated:

It is now possible to express yaw rate psi as a function of $\mu$, $\delta$, Fnvr, Fnvl, pB and Fnhr:

$$psi = f4(\mu, \delta, Fnvr, Fnvl, pB, Fnhr) \qquad (1)$$

This is an extra equation. This means that with a knowledge of psi, coefficient of friction $\mu$ may be determined from this equation, for example. Wheel brake pressure pB, steering angle $\delta$ or even the normal forces may also be determined from this equation.

However, if yaw rate psi is different from zero, this is associated with impaired driving comfort or even a safety risk for the vehicle and the driver (lateral movement of the vehicle not intended by the driver).

The invention described here makes it possible to achieve yaw rate psi=0, while at the same time a wheel brake pressure which is different from zero and a steering angle different from zero prevail. This permits identification of quantities through an extra equation without any negative effect on driving comfort or driving safety.

The goal of achieving a yaw rate of psi=0 is appropriate in the case of driving straight ahead in particular. This means that the vehicle continues to travel straight ahead even while the steering and braking intervention measures are being performed. In the case of turning a corner, the steering and braking interventions may be regulated in such a way that yaw rate psi remains constant.

Figure 4:
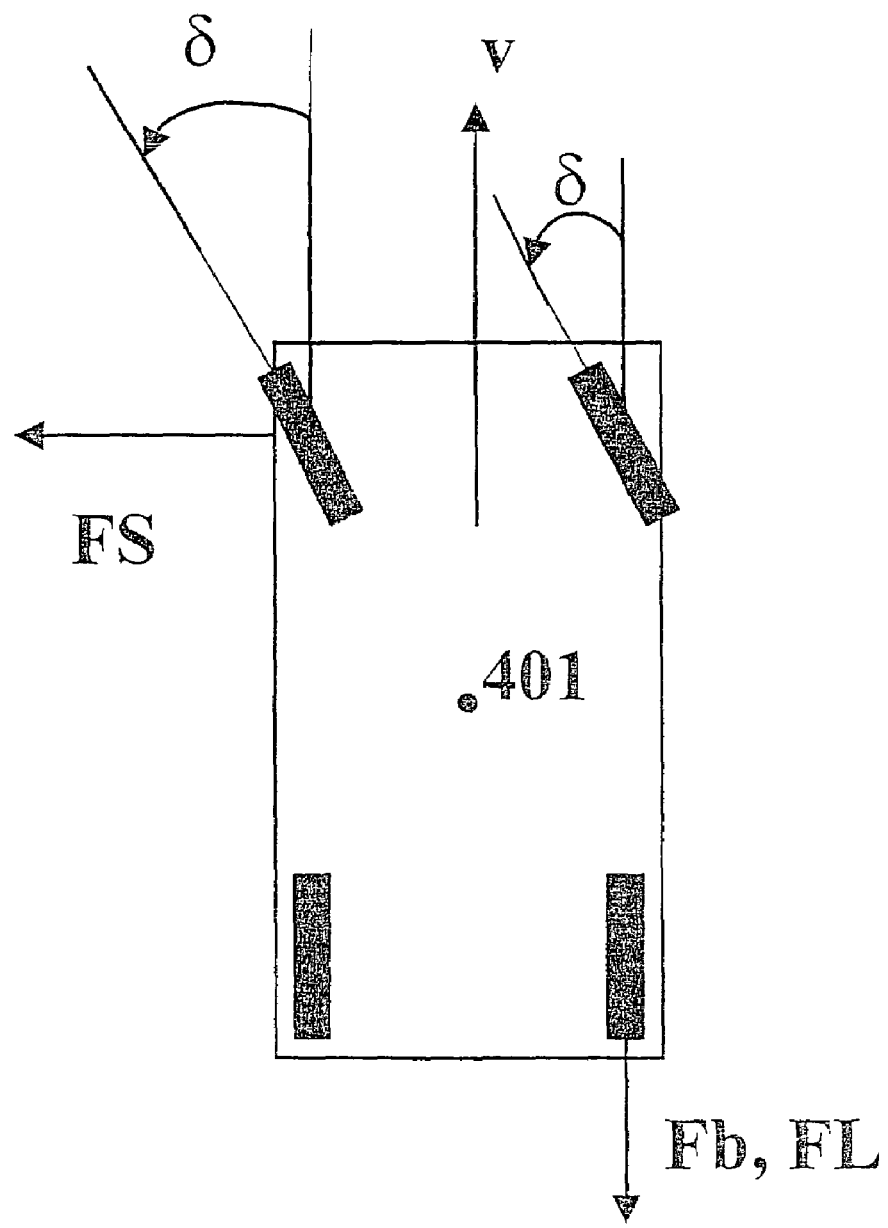
FIG. 4 shows a vehicle with forces acting on it.

This state of affairs is depicted graphically again in FIG. 4, where the center of gravity in the middle of the vehicle is labeled as 401. By steering the front wheels, a force FS acts to the left. This force tends to rotate the vehicle to the left about the center of gravity. Braking force Fb and/or longitudinal force FL acts toward the rear on the right rear wheel. This force tends to move the vehicle to the right around the center of gravity. If the moments exerted by these forces are in equilibrium, there is no rotational movement of the vehicle about the center of gravity and thus there is no yawing motion. Yaw rate psi is zero. Although there is a minor (braking) influence on the longitudinal movement of the vehicle, it does not constitute a safety risk. Furthermore, this braking influence may be compensated by increasing the engine torque.

Another point will also be explained here. Different values may be selected for the steering angle. For example, it is possible to begin with a steering angle of 1 degree and then shortly thereafter increase the steering angle to 2 degrees, etc. This means that a sequence of different steering angles is used. In parallel with this, a sequence of different braking pressures, i.e., braking forces, is applied to the right rear wheel because the yaw torque must always be compensated (and thus the yaw rate must always be negligible). Thus new numerical values for the steering angle and the brake pressure are used at each point in this sequence in the equation psi=0, yielding a sequence of equations.

The axle load distribution in the longitudinal direction of the vehicle is also explained in further detail. In a simple approximation, tire contact force Fnij for wheel ij is obtained through the equation

*Fnij*=*m**(static axle load distribution with respect to wheel *ij*)*(dynamic axle load distribution with respect to wheel *ij*).

In general it is true that

*Fnij*=*f5*(m, static axle load distribution, dynamic axle load distribution).

The wheelbase in the longitudinal direction and the distances of the axles from the center of gravity of the vehicle also enter into the static axle load distribution; for example, the load change in braking operations enters into the dynamic axle load distribution; m is the mass of the vehicle.

If tire contact forces that have been actually determined are used in formula 1 above for variables Fnvl, Fnvr and Fnhr, then a calculation of mass m is possible from the equation psi=0.

The determination of a brake characteristic is also explained in further detail. Let us assume that braking torque M is linked to brake pressure pB via function f6: M=f6 (pB). As a simple linear approximation, M=c*pB may even be assumed. The extra equation psi=0 (equation 1) may now be used to determine constant c or even function f6. To do so, for example, function f6 may be approximated by a polynomial having N unknown coefficients. If a sequence having N different steering angles (and of course the respective braking forces) is now run through, then by analyzing the N equations thus obtained, the N unknown coefficients may be determined. It is also conceivable to take hysteresis into account.

Determination of tire characteristics is also facilitated by the extra equation. To do so, the longitudinal and lateral forces acting on the tires are replaced by equations with parameters yet to be determined. At least one of these parameters may be determined by the extra equation. Several parameters may also be determined by this method. To do so, for example, different steering angles $\delta$ are set, then compensated by different braking forces so as to result in N different driving states, each with psi=0. This yields N different equations (each psi=0) which may be used for identification of N parameters (in mathematics, this corresponds to an equation system of N equations with N unknowns). In this method, the steering angle and braking intervention measures are thus implemented with graduated intensity.

Adhesion coefficients may also be determined by this method.

To do so, the longitudinal force and the lateral force on a tire are each depicted as a function of the adhesion coefficient. The unknown coefficients in these equations are identified as in the determination of the tire characteristics by this method.

Identification of the characteristic quantities yields two essential advantages:

1. The accuracy of the regulator interventions is increased due to the better adaptation of the vehicle dynamics regulator.
2. Regular safety checks may be performed to ensure, for example, that the actuators are functioning correctly.

To reduce the influence of the braking interventions on the longitudinal dynamics of the vehicle, the simultaneous implementation of active engine intervention measures is also conceivable. For example this means that there is an increase in engine torque at the same time.

Instead of the simultaneous implementation of braking and steering interventions as described here (and possibly also engine interventions), it is also possible to limit the determination of braking quantities to the brake and engine interventions. For example it is possible to brake the wheels that are not being driven while the engine torque is increased on the driven wheels. This also permits compensation of the influences of these two measures on the longitudinal dynamics of the vehicle.

The entire principle which has been depicted for the steering and the brakes may also be used for other active controllers, e.g., stabilizers or shock absorbers.

The method described here is recommended, for example, for the driving state when the vehicle is traveling straight ahead.

What is claimed is:

1. A system for determining quantities which influence the operating dynamics of a motor vehicle in the absence of hazardous driving states, comprising:
    a plurality of actuators;
    at least two different regulating/control arrangements, each of which is configured to, independently of one another and independently of the driver, use at least one of the actuators to carry out an intervention to influence the vehicle operating dynamics and to alter a same quantity which describes the vehicle dynamics;
    a control arrangement configured to cause two of these different regulating/control arrangements to implement corresponding interventions, each tending to cause the same quantity which describes the vehicle dynamics to be altered in an offsetting manner so that, as a result of a combination of the corresponding interventions, the same quantity is not altered or is altered as little as possible by the corresponding interventions; and
    an arrangement for determining, based on the same quantity, one or more quantities which influence the operating dynamics;
    wherein the one or more quantities which influence the operating dynamics include at least one of wheel loads, brake characteristic curves, tire characteristic curves, steering characteristic quantities, adhesion coefficients and inflatable-space-tire recognition.

2. The system according to claim 1, wherein at least two of the following regulating/control arrangements are provided as different ones of the at least two different regulating/control arrangements:
    a regulating/control arrangement which intervenes in the brakes,
    a regulating/control arrangement which intervenes in the engine,
    a regulating/control arrangement which intervenes in the steering of the vehicle,
    a regulating/control arrangement which intervenes in the vehicle shock absorbers, and
    a regulating/control arrangement which intervenes in the stabilizers.

3. The system according to claim 2, wherein the at least two different regulating/control arrangements include a regulating/control arrangement which intervenes in the steering of the vehicle and a regulating/control arrangement that intervenes in the brakes of the vehicle.

4. The system according to claim 1, wherein the corresponding interventions are performed simultaneously.

5. The system according to claim 1, wherein the quantity which describes the vehicle dynamics is a quantity whose change has an influence on the transverse dynamics of the vehicle.

6. The system according to claim 5, wherein the quantity which describes the vehicle dynamics is the yaw rate (psi).

7. The system according to claim 1, wherein the control arrangement causes the two of the regulating/control arrangements to implement the corresponding interventions only when the vehicle is traveling straight ahead.

8. The system according to claim 1, wherein the corresponding interventions are implemented with graduated intensity.

9. A method for determining quantities which influence the operating dynamics of a motor vehicle, based on a system containing at least two different regulating/control systems that can, independently of one another and independently of the driver, implement corresponding intervention measures influencing the vehicle dynamics with the help of suitable actuators and can thereby alter a same quantity which describes the vehicle dynamics, the method comprising:
    performing, by the at least two different regulating/control systems, at least two of the intervention measures which have an influence on the vehicle dynamics, each of the at least two of the intervention measures tending to cause the same quantity which describes the vehicle dynamics to be altered in an offsetting manner so that, as a result of a combination of the at least two of the intervention measures, the same quantity is not altered or is altered as little as possible by the intervention measures; and
    determining, based on the same quantity, one or more quantities that influence the operating dynamics;
    wherein the quantities that influence the operating dynamics include at least one of wheel loads, brake characteristic curves, tire characteristic curves, steering characteristic quantities, adhesion coefficients and inflatable-spare-tire recognition.

10. The method according to claim 9, further comprising:
    ascertaining, before determining the one or more quantities that influence the operating dynamics, whether the one or more quantities can be determined with manipulated variables currently available in the vehicle;
    wherein the at least two intervention measures are performed conditional upon ascertaining that the one or more quantities cannot be determined with the manipulated variables currently available.

* * * * *